United States Patent [19]

Adams

[11] Patent Number: 4,734,688

[45] Date of Patent: Mar. 29, 1988

[54] METHODS AND MEANS FOR TESTING FAULTS IN A LIQUID CRYSTAL DISPLAY SYSTEM

[75] Inventor: Jürgen Adams, Villingen-Schwenningen, Fed. Rep. of Germany

[73] Assignee: Mannesmann Kienzle GmbH, Villingen, Fed. Rep. of Germany

[21] Appl. No.: 770,163

[22] Filed: Aug. 27, 1985

[30] Foreign Application Priority Data

Sep. 1, 1984 [DE] Fed. Rep. of Germany ....... 3432247

[51] Int. Cl.⁴ .............................................. G09G 3/18
[52] U.S. Cl. .................................... 340/715; 340/765; 350/332
[58] Field of Search ............... 340/715, 758, 789, 784, 340/641, 642, 765; 350/332

[56] References Cited

U.S. PATENT DOCUMENTS

| | | | |
|---|---|---|---|
| 3,585,629 | 6/1971 | Baynard, Jr. | 340/793 |
| 3,866,171 | 2/1975 | Lashbough | 340/715 |
| 3,938,140 | 2/1976 | Garcia et al. | 340/715 |
| 4,188,625 | 2/1980 | Hodemaekers | 340/715 |
| 4,242,677 | 12/1980 | Jonath | 340/715 |
| 4,247,852 | 1/1981 | Utzinger | 340/765 |
| 4,297,692 | 10/1981 | Maier | 340/715 |
| 4,311,993 | 7/1982 | Strobel | 340/641 |
| 4,420,748 | 12/1983 | Jurgen | 340/765 |

*Primary Examiner*—Gerald L. Brigance
*Attorney, Agent, or Firm*—Toren, McGeady & Associates

[57] ABSTRACT

A method and arrangement for providing a continuous visual check on the operation of a standard liquid crystal display by superimposing a checking signal upon the operating signals applied to the individual segment and back electrodes of the LCD through individual impedance paths substantially higher than the individual impedance paths carrying the operating signal to the segment and back electrodes so that the operating signal overrides the checking signal under normal circumstances but the checking signal overrides the operating signal when the latter is interrupted due to a fault. The checking signal causes the segment electrode or back electrode whose signal is impaired to blink at a visually perceptible rate. Preferably, the frequency of the checking signal is in the order of 0.5 Hz to 2.0 Hz.

21 Claims, 5 Drawing Figures

FIG. 3
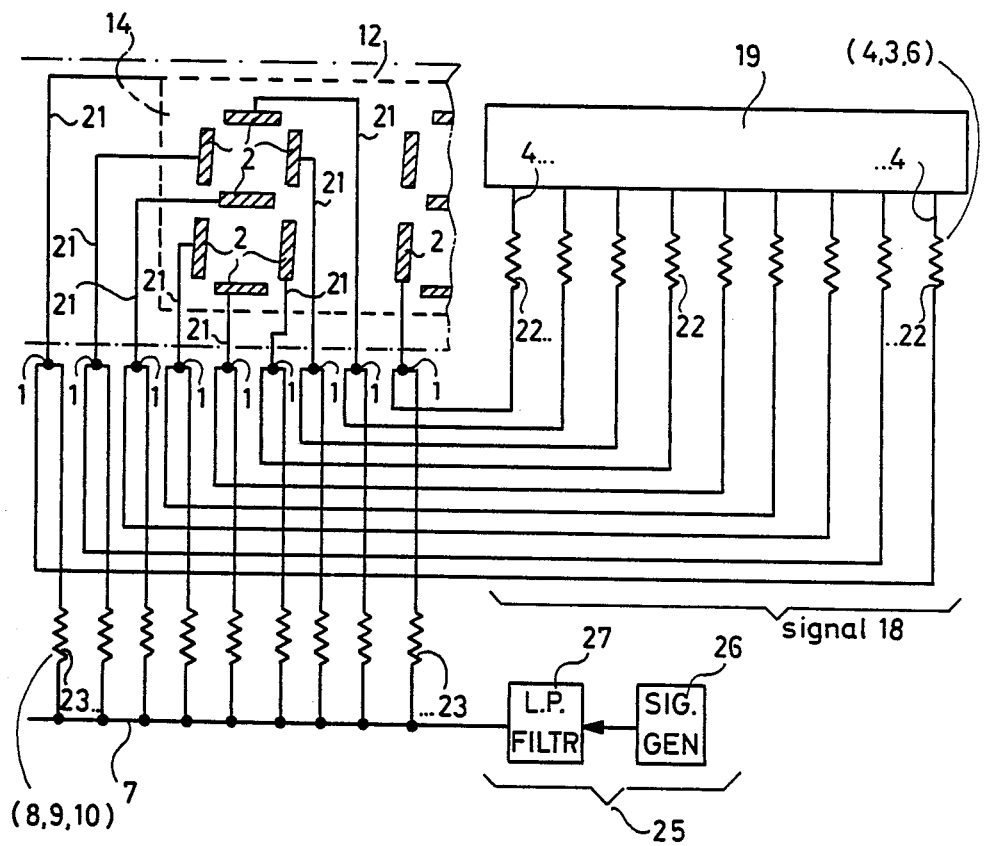
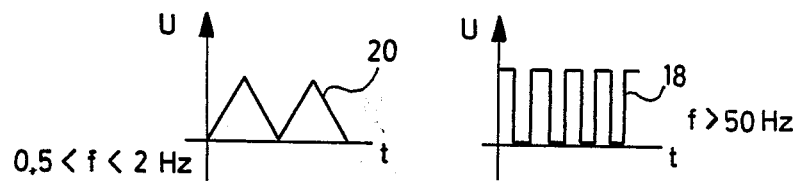
FIG. 4    FIG. 5

METHODS AND MEANS FOR TESTING FAULTS IN A LIQUID CRYSTAL DISPLAY SYSTEM

BACKGROUND OF THE INVENTION

1. Field of the Invention

This invention relates to liquid crystal display systems, and particularly to methods and means for detecting and displaying faults in such systems.

The invention is especially directed to methods and means for displaying improper functioning of a segement electrode (or electrode segment), a group of segments, back electrode, feed lines or leads, etc., in standard liquid crystal display (LCD) systems in which separately controllable electrode segments are energized in a static manner, or by multiplexing, to exhibit numerals, characters, or symbols.

Liquid crystal displays have assumed greater and greater importance in the field of electro-optical indicators as their degree of development has increasingly progressed. A typical example of their application is in a numerical read-out in which each numeral is formed by energizing appropriate segments of a 7-segment component. The individual 7-segment component or several together may form an LCD module or cell.

The basic construction of a liquid crystal display is known. Generally, two glass plates facing one another are coated on their opposing surfaces with thin transparent or translucent conductive layers and sandwich a nematic liquid crystal between them. Typically, one of the opposing layers is divided into the separate conductive electrode segments and the other layer forms a back electrode. When a voltage is connected from the thin back electrode layer to one or more of the segments formed from the other electrode layer, the resulting electrical field forms zones of different refractive indices or different dispersions in the liquid crystal so that one zone can be distinguished from another.

Depending upon the structure of the segments, the liquid crystal cell can be used for displaying numerals, letters, or other informative symbols. The display can be made reflective by using incident light, transmissive by using transmitted light, or transreflective using both transmitted and incident light, depending upon different arrangements of reflectors.

Such liquid crystal displays may be considered passive as distinguished from active displays such as, for example, those using light-emitting diodes (LED's), because basically they do not produce their own light, but rather merely modulate ambient light.

One of the many important advantages of a liquid crystal display is its very low current consumption. However, this very low current consumption makes it practically impossible to check the operation of a liquid crystal display. This contrasts with active displays, such as LED displays, where checking of the display is simple because the individual current flows can simply be measured and compared retroactively with prior information. An errror signal can thus be derived, if necessary. On the other hand, a similar segment check in passive displays, such as liquid crystal displays, does not produce any usable result. This difficulty arises because of the very numerous low segment currents which fluctuate relatively sharply.

2. Description of Related Art

Redundant displays have been proposed to increase the reliability of LCD's. Such a display appears in DE-OS No. 24 02 749. Another certainty-enhancing proposal involves more extensive segmentation of the individual character symbols. This appears in DE-OS No. 24 59 488. However, these schemes raise production and circuit costs considerably.

To counter this unsatisfactory state of liquid crystal displays, German patent document DE-OS No. 27 43 907 proposes that the front plates carry additional electrodes, known as check electrodes, which are electrically connected with each of the segment electrodes, i.e., the "endangered' electrodes. During failure or incorrect control of one the segment electrode, the system shows another character from the character reservoir of the display. At the same time, the back plate with the back electrode contains another back electrode, i.e., a "check back electrode", located only opposite the check electrodes. However, this requires additionally connecting practically all the so-called endangered segment electrodes, that is, at least five segment electrodes in a 7-segment numerical display, to a check electrode. It also requires the back plate of the display to contain an additional check back-electrodes which cooperate exclusively with the check electrodes. Furthermore, it requires that the carrier plates accommodate five check electrodes and a check back electrode as well as a checking circuit in addition to the conventional 7-segment electrodes and back electrode. This constitutes a substantial expenditure because of the large quantity of separately distributed electrical connections that are necessary. It also creates a large source of errors. Moreover, this system is costly and fails to furnish any possibility for checking conventional LCD modules.

The disclosures in the German patent document DE-OS No. 30 26 848 and DE-OS No. 29 51 584 attempts to obtain error interpretations via various segment electrodes and back electrode arrangements. In DE-OS No. 30 26 848, each segment electrode is connected to a driver circuit for conventional control via a first conductor path, and at the same time, a current loop is formed for each segment control via the connection by means of a second conductor path. A test capacitor in each current loop is charged and discharged during the control of the respective segment when the segment is activated by multiplexing. A resistance in the discharge current loop, which is identical for all test segment connections, produces a measurable voltage drop which can be triggered by means of the discharge current. However, such devices are complicated and expensive.

In DE-OS No. 29 51 584, the control signal to the segment electrode from the control conductor is transferred to a second separate conductor path via an electrically anisotropic resistance layer and is supplied to monitoring electronics as a check signal. In the two monitoring circuits, an error display must finally be initiated in an error reporting device.

Standard LCD's cannot be monitored, or, if so, only with considerable difficulty by checking the or control current or the control output. Accordingly, the methods for meeting the requirements set forth for checking are directed toward providing a high Hamming distance (point matrix) or providing redundancy by means of double segments or by means of segment electrodes and back electrode arrangements in multiplex systems. The redundancy responds to interference or disturbance by preventing segment combinations which can be incorrectly interpreted.

When error sources and their effects on LCD system are analyzed, the actual error sources can be localized in the area of the display element or in the area of the control circuit. As a rule, errors in the display module, such as leaky medium cells caused by aging, exceeding, or dropping below, permissible operating temperature ranges, glass breakage, defective polarizes, and the like, affect all segments or the entire display modular component. To this extend, such a defective phenomenon can be immediately seen and recognized.

Unobvious display errors are, as such, not detectable by the viewer. As a rule, they occur in the control area when individual segments fail or are incorrectly activated in the course of the display operation. An example of such failures are interruptions of signal lines or conductors, defective contacts at the display module, or defective conductor paths. Faults that subject display segment configurations to incorrect interpretation can occur continuously or intermittently. An improperly energized segment can change an 8 to 9 or a 0 without a detectable cause for a signal interruption to the segment. Therefore, an unconditional requirement exists for means which are able to detect and display incorrect indications that cannot be perceived by the eye. This is especially important for official approval of devices which are capable of being calibrated, such as taximeters, price indicators or gasoline products, remote transmission installations, and the like.

SUMMARY OF THE INVENTION

An object of the invention is to improve liquid crystal display systems.

Another object of the invention is to provide methods and means for checking LCD's.

Yet another object of the invention is to provide checking means and methods for achieving a permanent visual checking ability of standard LCD's which resist an autonomous display check because of a low control capacity.

According to a feature of the invention, these objects are attained in whole or in part by superimposing a redundant checking signal on all the operating signals supplied to all LCD electrodes and segments so that interruption of the operating signals activates the checking signal at the impaired LCD electrode such that the impaired segment or the impaired segment group subsequently blinks as a perceptible sign of a failure. According to another feature of the invention, a high impedance supply lead applies the separate checking signal jointly to all LCD electrodes without discriminating as to segment connection or back electrode connections.

These and other features of the invention are pointed out in the claims. Other objects and advantages of the invention will become evident from the following detailed description when read in light of the accompanying drawings.

BRIEF DESCRIPTION OF THE DRAWINGS

FIG. 3 is an equivalent circuit showing the LCD cell of FIG. 1 used to control a segment configuration of numerals with operating signals and checking signals.

FIG. 4 depicts the preferred signal waveform of a check signal in FIG. 3.

FIG. 5 illustrates the waveform of an operating signal in FIG. 3.

DETAILED DESCRIPTION OF PREFERRED EMBODIMENTS

Figure 1:
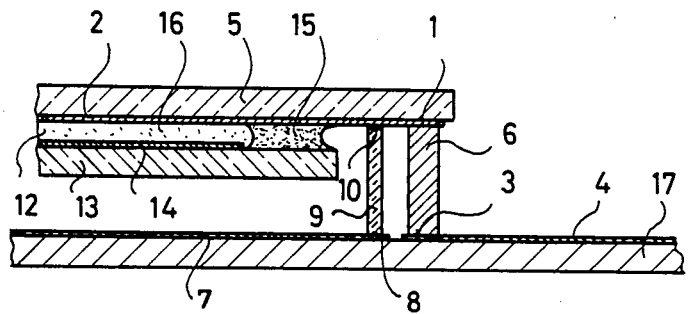
FIG. 1 is a schematic cross-sectional view of an LCD cell with signal feed lines for feeding operating signals and check signals from a printed circuit board to the electrodes.

The environment and principles of the invention are best illustrated in the simplified equivalent circuit diagram of FIG. 3. Here, an LCD control circuit 19 applies operating signals 18 such as those shown in FIG. 5, to the display contacts 1 of an LCD cell 12 through separate conductor paths 4 exhibiting resitances 22. The LCD cell 12 employs a seven-segment configuration for showing numerals. Specifically, each numeral is formed by a circuit 119 energizing appropriate segment electrodes 2, of a seven-segment configuration through the conductors 21 connected to the display contacts 1. The voltages applied to the segment electrodes 2 are relative to a back electrode 14 and, with a potential at the electrode 14, form electric fields that control the display. The resistances 22 represent the impedances of intermediate connectors, to be described, and exhibit values $R_H$ of less than 100 kohms. For simplicity, the members 2 are referred to both as electrode segments and segment electrodes.

A saw-tooth checking signal generator circuit 25 composed of a square wave signal generator 26 followed by a low pass filter 27, produces a saw-tooth 20 checking signal, such as that shown in FIG. 4, at a conductor 7. Separate resistances 23 all connected to the conductor 7 represent contact and component resistances to be described and apply the saw-tooth checking signal 20 to the contacts 1. The values $R_K$ of the resistances 23 are between 5 megohms and 470K ohms, substantially greater than the values of the resistances 22. Moreover, the frequency of the checking signal 20 is substantially lower than the frequency of the operation signal 18.

Essentially, the system superposes the weak checking signal 20 from the generator 25 onto the stronger operating signals 18 from the circuit 19 at the segment electrodes 2. During normal operation, operating signals 18 overwhelm the checking signals 20, and the latter have no discernable effect upon the display. On the other hand, failure of for example, one of the particular operating signals 18 in the circuit 19 or between the circuit 19 and the display contacts 1 suppresses the operating signal and allows the checking signal 20 to be discerned in the form of a flicker of the relevant segment electrode 2.

Figure 2:
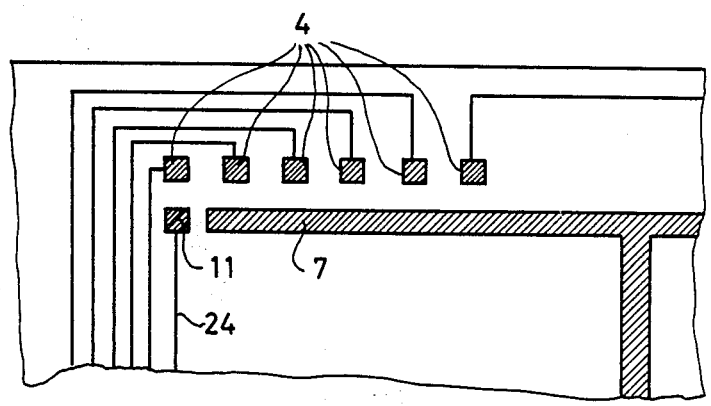
FIG. 2 is a top view of the circuit of FIG. 1 showing an arrangement of the conductor paths for the operating signal feed and the checking signal supplied.

Details of the structure of a portion of the LCD cell with its feed lines to one of the segments 2 appear in FIGS. 1 and 2. However, this structure is also applicable to the wiring of other segment electrodes and the back electrodes 14.

In FIG. 1, the LCD cell includes two glass plates 5 and 13, arranged parallel to one another. Coating the inner surfaces of the glass plates 5 and 13 are electrode layers in the form of the segment electrodes 2 and the back electrodes 14, respectively which are shaped to correspond to the desired display configuration. The electrodes 2 and 14 extend outside of the LCD cell 12 for application of signals thereto in order to perform their desired functions. A glass solder frame 15, which bonds to the glass plates 5 and 13, determines the spacing between the glass plates. Bonding to the plates 5 and 13 of the frame 15 is accomplished, for example, by heating and serves to seal the intermediate space of the LCD cell 12. The cell 12 is filled through a fill opening with a nematic liquid crystal 16 and thereafter hermetically sealed.

Segment electrodes 2 and back electrodes 14 are connected with a corresponding quantity of display contacts 1 outside the LCD cell 12 by means of separate conducting connections. Conductor lands 4 on a printed circuit board 17 pass signals to the display contacts 1 via contact points 3 and a conducting rubber connector 6. This readies the LCD for operation. The conducting rubber connector 6 is an anisotropically conducting connector which contacts 40% to 60% of the available surface.

The elements 4, 3, 6, and 1, pass the operating signal 18 of FIG. 5 from the LCD control circuit 19 to the segment electrodes 2. The LCD control circuit 19 may, for example, include or be controlled by the usual electronic system for generating the desired data to be displayed. In the circuit of FIG. 3, the resistances 22 represent the combined resistances of the elements 4, 3, 6, and 1. It should be recognized that a separate path composed of elements 4, 3, 6, and 1, leads to each of the segment electrodes 2 in the cell 12, although only a single segment electrode 2 is shown in FIG. 1.

If transmission errors occur, their cause generally lies in supply line interruptions and/or contact problems at the transmission contact points 1 and 3. An interruption of the signal flow or of the conducting connections from the display contact 1 to the segment electrode 2 or back electrode 14 on the glass plates 5 and 13 occurs through glass breakage and is detectable as such. This means that an effective check of the signal flow is concentrated in the area of the signal supply lines. The feed of the operating signals 18 from the LCD control circuit 19 to each segment electrode 2 occurs via the conductor path 4, the contact point 3, the conducting rubber connector 6, an additional contact point at the transition to the display contact 1, and finally, to the segment electrode 2 or back electrode 14. Because of the capacitive action of the segment electrodes 2 relative to the back electrodes 14, and vice versa, and because the alternating current frequency is greater than 50 Hz, the supply line resistance created at the signal flow positions 4, 3, 6, and 1, may not exceed magnitudes of $R_H < 100K$ ohms without the occurrence of contrast loss.

To display defective or malfunctioning supply lines to electrode segments (segment electrodes), segment groups, or back electrodes of standard LCDs operating in a static or multiplex mode, a redundant checking signal 20 is applied to the LCD electrodes 2 and 14 by superposing the checking signal 20 onto the operating signals 18 appearing at the segment electrodes 2 and back electrodes 14. In this way, interruption of the operating signal 18 allows the checking signal 20 to become active at the LCD electrodes 2 and 14. Hence, the segment electrode 2 or the group of segments electrodes 2 whose operation is impaired blinks as a perceptible sign of interruption of the operating signal 18. In effect, interruption of the operating signal 18 activates the checking signal 20 at the electrode 2 or 14 whose operation has been impaired.

To achieve such continuous, visual monitoring of standard LCDs, a high impedance supply applies separate checking signals 20 to all of the LCD electrodes 2 and 14 without discriminating between segment electrode connection and back electrode connection. Specifically, the high impedance supply is composed of the supply line 7 and the separate impedances 23, each of which is composed of elements 8, 9, and 10. The supply line 7 and the elements 8, 9, and 10, jointly pass the signal 20 to all of the LCD electrodes 2 and 14. In order to arrive at the LCD electrodes 2 and 14, the checking signal 20 is fed to the display contacts 1. This is accomplished, as shown in FIG. 1, by means of a land or surface conductor, also designated 7, that forms the supply line 7 on the printed circuit board 17. The supply line 7 is common to all of the electrodes 2 and 14 as well as the display contacts 1. On the other hand, each display contact 1 is connected with the line 7 by means of separate resistances 23, each composed of a contact surface 8, a high impedance isotropic connector 9, and a contact surface 10. The connector 9 and the contact surfaces 8 and 10 forming each resistance 23 conduct current from the display supply line 7 to the contact 1.

The elements 8, 9 and 10 for guiding the checking signals 20 differ substantially from the elements 4, 3, 6, and 1, for transmitting the operating signal 18. This is especially so in that the conductor surface 7 has a comparatively large area and can be constructed so as to be free of interruption. In addition, the entire surface of the overlapping contact points are available to the contact surfaces 8 and 10 as useful contact zones. This contrasts, for example, with the conducting rubber connections 6 that passes the operating signal, and which can contact only up to approximately 40% to 60%. Finally, the connector 9 conducts isotropically, so that partial interruption zones in the transition areas of the contact faces 8 or 10 are circumvented with respect to signal passage.

The paths of the checking signal 20 to the display contacts 1 through the elments 7, 8, 9, and 10, have a higher impedance by a factor of 5 to 100 than that of the paths of the operating signals 18 to the display contacts 1 via the elements 4, 3, and 6. Accordingly, in addition to the differences between the paths of the checking signal and the operating signal, the checking signal path 20 is less critical relative to neutral contact states. Moreover, the high impedance supply of the checking signal 20 does not adversely influence the flow of the operating signal 18.

Preferably, the checking signal 20 is not rectangular but has long slope times. Accordingly, it is triangular or saw-toothed sinusoidal, has an e-function shape, or combinations of these. These waveforms produce a varying contrast at the segment electrodes 2 or segment groups whose supply lines have been disturbed, regardless of the operating signals which might possibly occur at the electrodes or segment groups. The frequency of the control signal 20 accordingly lies in the range of approximately 0.5 to 2 Hz.

In any case, the aforementioned waveforms result in formation of varying contrast at the segment electrodes 2 whose supplies have been impaired, because if the supply line to a segment electrode 2 is interrupted, its back electrode 14 still receives operating signals 18, and conversely, if a supply line to the back electrode 14 is interrupted, the corresponding segment electrodes 2 still receive the operating signals 18.

In an interruption occurs in the supply lines passing the operating signals 18, and the interruption raises the resistance of the supply line to the order of magnitude of the resistance of the supply line carrying the checking signal 20, the superposing of the checking signal 20 upon the operating signal 18, which was dominated by the operating signal 18 prior to its interruption, occurs such that the segment electrode 2 is coupled to the checking signal 20 by a high impedance. Its contrast hence changes in (double) rhythm with the checking signal 20 whose frequency $f_K$ approximates 0.5 Hz to 2 Hz. Accordingly, interruption of the operating signal can be visually detected with great clarity.

The resistance of the supply lines carrying the checking signals 20 is determined by the low frequency of the checking signal, and by the need to maintain the supply line impedance small enough so that leakage currents (for example, because of dirt on the printed circuit board) do not substantially weaken the checking signal 20. Hence, the resistances 23 in the path of the checking signals 20 have values $R_K$ between 470K ohms and 5 megohms.

As discussed, FIG. 3 shows a simplified equivalent circuit for control of a 7-segment configuration for displaying numerals. The segment electrodes 2 receive currents from outside the LCD cell 12 via lines 21, which are provided with suitable display contacts 1. The operating signals 18 are applied to the display contacts 1 of the individual segment electrodes 2 or back electrodes 14 via the output of the LCD control circuit 19 by means of separate conductor paths 4 and a resistance element 22. The resistance element 22 symbolizes the supply line resistance $R_H$, which is less than 100K ohms, across each contact path 4, contact point 3, conducting rubber connector 6, and display contact 1. The signal shape of the operating signal 18 is shown as a symmetical rectangular voltage signal with a frequency F greater than 50 Hz, as shown in FIG. 5.

In contrast to this, as shown in FIG. 4, a signal with a long slope time and low frequency of approximately 0.5 Hz to 2 Hz is indicated as the preferred signal shape of the checking signal 20. The checking signal 20 is guided via the common conductor surface 7, the high impedance isotropically conducting connector 9 and the contact surface 10, to the display contacts 1. The high impedance characteristic of the feed line (or lead) for the checking signals 20 to the display contacts 1 is symbolized by means of the resistance 23.

According to another embodiment of the invention, the checking signal 20 is fed via a thick layer resistor 23 which is applied directly to the display connection surface, instead of by using the isotropically conducting connector element 9. A high impedance paste with high tolerances is utilized for this purpose.

For monitoring, the checking signal 20 can be tapped off from a point which insures that the checking signal 20 is applied to the connector 9 or the thick layer resistors 23. Such a tap can be formed for a connector 9, as shown in FIG. 2, as an additional contact surface 11 on the conductor path 7. It can be connected at an input of the a microprocessor, not shown in more detail, for controlling this system and/or the display. The microprocessor automonously and electrically carries out the function of surveillance. The microprocessor may be part of the control circuit 19.

In order to produce the checking signal 20, the signal generator circuit 25 includes a signal generator 26 and a low-pass filter 27. The signal generator circuit 25 obtains its fundamental frequency from a signal source other than the LCD control circuit 19 and may include a frequency divider. The low-pass filter 26 is an RC low-pass filter of the first order whose time constant is approximately inversely proportional to the checking signal frequency. This is sufficient for producing the long slope times of the checking signals 20.

The circuit 19 may energize the segment electrodes 2 and back electrodes 14 on a static basis or by multiplexing the signal 18.

The arrangement in the Figures allow continuous visual checking of the LCD during operation. If, for example, the control of a segment 2 fails intermittently or continuously as a result of a signal line being subject to interruption which causes improper interpretation of the meaning of a display segment configuration, the defective segment 2 blinks in response to the superposed checking signal 20 overriding the interrupted operating signal 18, even if the signal interruption to this impaired segment were otherwise undetectable. The irregular signal at this segment electrode 2 becomes obvious and detectable.

A segment group of an LCD display which is multiplexed reacts comparably with the aforementioned arrangement. The segment group blinks and changes the number image, for example, from "7" to "8". The defective segment electrode or segment groups blink at double the frequency of the checking signal 20.

During a failure of the back electrode signal of a statically controlled LCD, the entire segment configuration of the impaired location blinks or flickers. During the failure of one or more back electrode signals in a multiplex system, the segments which are assigned to the improperly energized back electrode blink.

While embodiments of the invention have been described in detail, it will be evident to those skilled in the art that the invention may be embodied otherwise without departing from its spirit and scope.

What is claimed is:

1. A method for visually indicating a malfunction in supply lines to a liquid crystal display, said display including a plurality of segment electrodes, at least one back electrode, and a plurality of separately controllable display contacts for connecting said segment electrodes and said back electrode, respectively, to said supply lines, said method comprising:

generating separate operating signals for said segment electrodes and said back electrode, said separate operating signals causing a relatively steady display of said segment electrodes;

applying said separate operating signals through said supply lines to said segment electrodes and said back electrode;

generating checking signals for said segment electrodes and said back electrode, said checking signals being capable of causing said segment electrodes to visibly blink; and applying said checking signals through respective impedance paths to said segment electrodes and said back electrode so that said checking signals are in superposition with said operating signals, said operating signals being different from said checking signals and said impedance paths each having an impedance which is substantially larger than that of said supplying, whereby when there is no malfunction in said supply lines, said operating signals override said checking signals and the segment electrodes and the back electrode are effectively driven by said operating signals, while when there is a malfunction in said supply lines either blocking or substantially limiting said operating signals, said segment electrodes and said back electrode are driven by said checking signals thereby causing said segment electrodes to visibly blink.

2. A method as in claim 1, wherein said checking signals and said operating signals each have a frequency and waveshape, and wherein at least one of the frequency and waveshape of the checking signals differs from the frequency and waveshape of the operating signals.

3. A method as in claim 2, wherein the frequency of the checking signals differs from the frequency of the operating signals.

4. A method as in claim 3, wherein the frequency of the checking signals is substantially less than the frequency of the operating signals.

5. A method as in claim 2, wherein the waveshape of the checking signals differs from the waveshape of the operating signals.

6. A method as in claim 1, wherein the frequency and the waveshape of the checking signals differ from the frequency and waveshape of the operating signals.

7. A method as in claim 1, wherein the checking signals have a triangular shape, a sinusoidal shape, or an e-function shape while said operating signals have a symmetrical rectangular shape to produce a visual contrast between the checking signals and the operating signals in the display of the electrodes.

8. A method as in claim 7, wherein the frequency of the checking signals is in the range of 0.5 Hz to 2.0 Hz.

9. A circuit arrangement for a liquid crystal display having a first transparent substrate overlying a second transparent substrate in spaced relation, a plurality of segment electrodes and at least one back electrode arranged, respectively, on opposing inner surfaces of said first and second substrates, and a plurality of separate controllable display contacts connected, respectively, to said segment electrodes and said back electrode, said circuit arrangement comprises:

means for generating separate operating signals for said segment electrodes and said back electrodes, said separate operating signals causing a relatively steady display of said segment electrodes;

means for applying said separate operating signals through supply lines to said segment electrodes and said back electrode;

means for generating checking signals for said segment electrodes and said back electrode, said checking signals being capable of causing said segment electrodes to visibly blink; and means for applying said checking signals through respective impedance paths to said segment electrodes and said back electrode so that said checking signals are in superposition with said operating signals, said operating signals being different from said checking signals and said impedance paths each having an impedance which is substantially larger than that of said supply lines, whereby when there is no malfunction in said supply lines, said operating signals override said checking signals and the segment electrodes and the back electrode are effectively driven by said operating signals, while when there is a malfunction in said supply lines either blocking or substantially limiting said operating signals, said segment electrodes and said back electrode are driven by said checking signals thereby causing said segment electrodes to visibly blink.

10. A circuit arrangement as in claim 9, wherein the impedances of the impedance paths are five times greater than the impedance of the supply lines.

11. A circuit arrangement according to claim 10, wherein the checking signals applying means includes a common conductor, and the impedance paths each include a high-impedance uniformly conducting connector connected to the common conductor.

12. A circuit arrangement as in claim 9, wherein the checking signals applying means includes a common conductor and the impedance paths each include a high-impedance uniformly conducting connector connected to the common conductor.

13. A circuit arrangement as in claim 9, wherein said impedance paths each include a high-resistance thick-layer resistor connecting said checking signals generating means to one of the display contacts of the liquid crystal display.

14. A circuit arrangement as in claim 13, wherein the resistance of each resistor is five times greater than the impedance of the supply lines.

15. A circuit arrangement according to claim 9, wherein said checking signals and said operating signals each have a frequency and waveshape, and wherein at least oe of the frequency and waveshape of the checking signals differ from the respective frequency and waveshape of the operating signals.

16. A circuit arrangement according to claim 15, wherein the frequency of the checking signals differs from the frequency of the operating signals.

17. A circuit arrangement according to claim 16, wherein the frequency of the checking signals is substantially less than the frequency of the operating signals.

18. A circuit arrangement according to claim 15, wherein the waveshape of the checking signals differs from the waveshape of the operating signals.

19. A circuit arrangement according to claim 9, wherein a frequency and a waveshape of each of the checking signals differ from a frequency and a waveshape of each of the operating signals.

20. A circuit arrangement according to claim 9, wherein the checking signals have a triangular shape, a sinusoidal shape, or an e-function shape while said operating signals have a symmetrical rectangular shape to produce a visual contrast between the checking signals and the operating signals in the display of the electrodes.

21. A circuit arrangement according to claim 20, wherein the frequency of the checking signals is in the range of 0.5 Hz to 2.0 Hz.

* * * * *